United States Patent
Ootsuka et al.

(10) Patent No.: US 10,513,623 B2
(45) Date of Patent: Dec. 24, 2019

(54) AQUEOUS INK, INK CARTRIDGE AND IMAGE RECORDING METHOD

(71) Applicant: CANON KABUSHIKI KAISHA, Tokyo (JP)

(72) Inventors: Masanobu Ootsuka, Tokyo (JP); Masahiro Terada, Hadano (JP); Hidetaka Kawamura, Yokohama (JP); Akihiro Taya, Yokohama (JP); Yohei Masada, Tokyo (JP); Takaharu Aotani, Tokyo (JP); Shoji Koike, Yokohama (JP); Yutaka Yoshimasa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/039,463

(22) Filed: Jul. 19, 2018

(65) Prior Publication Data
US 2019/0031900 A1   Jan. 31, 2019

(30) Foreign Application Priority Data
Jul. 25, 2017 (JP) .................... 2017-143573

(51) Int. Cl.
*C09D 11/36* (2014.01)
*B41J 2/175* (2006.01)
(Continued)

(52) U.S. Cl.
CPC .......... *C09D 11/36* (2013.01); *B41J 2/17503* (2013.01); *B41M 5/0023* (2013.01);
(Continued)

(58) Field of Classification Search
CPC ..... C09D 11/36; C09D 11/322; C09D 11/033; C09D 11/037; C09D 11/102;
(Continued)

(56) References Cited

U.S. PATENT DOCUMENTS 4,853,036 A   8/1989   Koike et al.
5,067,980 A   11/1991  Koike et al.
(Continued)

FOREIGN PATENT DOCUMENTS

EP   0 808 882 A2   11/1997
JP   H03-255171 A   11/1991
(Continued)

OTHER PUBLICATIONS

Oct. 26, 2018 extended European Search Report in European Patent Appln. No. 18184395.4.

*Primary Examiner* — Stephen D Meier
*Assistant Examiner* — Alexander D Shenderov
(74) *Attorney, Agent, or Firm* — Venable LLP

(57) ABSTRACT

An aqueous ink according to the present invention is an aqueous ink for ink jet, containing a solvent A and a resin particle. The solvent A is alcohol of which aqueous solubility at 20° C. is 5% by mass or less, a vapor pressure at 20° C. is 0.5 mmHg or less and a surface tension at 20° C. is 30 mN/m or more. A content (% by mass) of the solvent A is 0.7 times or more to 7.0 times or less in terms of a ratio based on aqueous solubility (% by mass) of the solvent A at 20° C. The amount of a surface anionic functional group of the resin particle is 0.55 mmol/g or more to 2.00 mmol/g or less.

16 Claims, 1 Drawing Sheet

(51) Int. Cl.
*B41M 5/00* (2006.01)
*C09D 11/033* (2014.01)
*C09D 11/037* (2014.01)
*C09D 11/102* (2014.01)
*C09D 11/107* (2014.01)
*C09D 11/108* (2014.01)
*C09D 11/322* (2014.01)
*C09D 11/38* (2014.01)

(52) U.S. Cl.
CPC .......... *C09D 11/033* (2013.01); *C09D 11/037* (2013.01); *C09D 11/102* (2013.01); *C09D 11/107* (2013.01); *C09D 11/108* (2013.01); *C09D 11/322* (2013.01); *C09D 11/38* (2013.01)

(58) Field of Classification Search
CPC ..... C09D 11/107; C09D 11/108; C09D 11/38; B41M 5/0023; B41J 2/17503
USPC .......................................................... 347/20
See application file for complete search history.

(56) References Cited

U.S. PATENT DOCUMENTS

| | | | |
|---|---|---|---|
| 5,124,718 A | 6/1992 | Koike et al. | |
| 8,328,341 B2 | 12/2012 | Koike et al. | |
| 8,408,691 B2 | 4/2013 | Koike et al. | |
| 8,955,953 B2 | 2/2015 | Hakiri et al. | |
| 9,862,845 B2 | 1/2018 | Aotani et al. | |
| 2003/0195274 A1* | 10/2003 | Nakamura | B01J 13/04 523/160 |
| 2008/0006176 A1* | 1/2008 | Houjou | C09D 11/322 106/31.13 |
| 2010/0309260 A1 | 12/2010 | Hakiri et al. | |
| 2016/0053125 A1* | 2/2016 | Shimanaka | C08F 293/005 524/88 |
| 2017/0210918 A1 | 7/2017 | Masada et al. | |
| 2017/0210919 A1* | 7/2017 | Yoshimasa | B41J 2/01 |
| 2017/0210926 A1 | 7/2017 | Kawamura et al. | |
| 2017/0210927 A1 | 7/2017 | Kawamura et al. | |
| 2018/0009927 A1* | 1/2018 | Suzuki | B41M 5/00 |
| 2018/0179408 A1 | 6/2018 | Taya et al. | |

FOREIGN PATENT DOCUMENTS

| | | |
|---|---|---|
| JP | 2000-297237 A | 10/2000 |
| JP | 5196235 B2 | 5/2013 |
| JP | 2015-007175 A | 1/2015 |
| WO | 99/50365 A1 | 10/1999 |
| WO | 00/36030 A1 | 6/2000 |
| WO | 00/78876 A1 | 12/2000 |

* cited by examiner

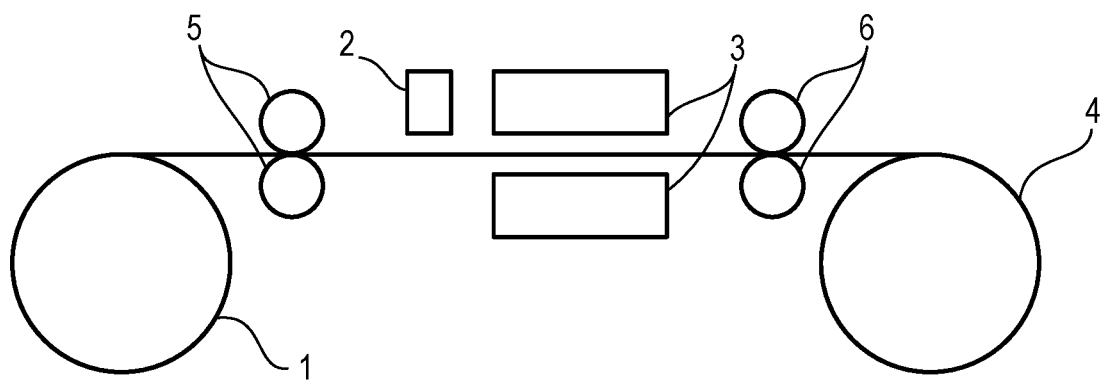

AQUEOUS INK, INK CARTRIDGE AND IMAGE RECORDING METHOD

BACKGROUND OF THE INVENTION

Field of the Invention

The present invention relates to an aqueous ink, an ink cartridge and an image recording method.

Description of the Related Art

An ink jet type image recording method has advantages such as low noise, low running cost and easy coloring. Therefore, the ink jet type image recording method is now widely used not only in a printer for home use but also a copier or commercial printing industry for which high-speed printing is required.

In the ink jet type image recording method, miniaturization of ink droplets is progressing for achieving high image quality and further improvement in an image quality is being required. Under such circumstances, improvement in intermittent ejection property (referred to as initial-ejection stability in some cases) is regarded as a particularly important task. In a case where an ink is not ejected for a long time from a part of ejection orifices of a recording head and a recovery operation of the recording head is not performed, moisture and the like in the ink evaporate from the ejection orifice and viscosity increase of the ink or sticking of the ink to the nozzle occurs. Thereafter, when the ink is caused to be ejected again from the ejection orifice, since ejection of a first-ejected ink becomes unstable or an ink is not ejected, there may be a case where an image tends to be disturbed.

In recent years, a line type image recording method using a line type recording head wider than a recording medium (paper) has been adopted. In the line type image recording method, an ink is applied to a recording medium conveyed under the recording head which is in a fixed state, and an image is recorded in a so-called single pass. The line type image recording method has an advantage of capable of higher speed printing compared to a serial type image recording method in which an image is recorded by conveying a recording medium while reciprocating the recording head right and left.

In a case of the serial type method, the recording head (nozzle) passes one portion of the recording medium a plurality of times, whereas in the line type method, the recording head (nozzle) passes one portion of the recording medium only one time. Therefore, in the serial type method, although one nozzle has a defect, it is possible to prevent the image quality from being degraded, by other nozzles covering the defect, whereas in the line type method, when a defect occurs in one nozzle, the image quality tends to be degraded immediately. Accordingly, in the line type image recording method, improvement of the intermittent ejection property is a very important task.

In order to prevent the nozzle of the recording head from being clogged, for example, an ink jet ink using a liquid medium containing alkylene glycol having 7 or more carbon atoms has been proposed (Japanese Patent Application Laid-Open No. H03-255171). In addition, an ink jet ink in which ethylene glycol organic solvent is contained in a larger amount than other organic solvents has been proposed (Japanese Patent Application Laid-Open No. 2000-297237). Further, an ink jet ink in which a poorly water-soluble compound and an easily water-soluble compound are combined at a predetermined ratio as an evaporation inhibitor has been proposed (Japanese Patent Application Laid-Open No. 2015-7175).

Incidentally, in the commercial printing industry, it is required to be capable of printing a large amount of images at a lower cost. Therefore, it is desired to be capable of recording a high quality image having high optical density not only on inexpensive thin printing paper but also on thin plain paper not having an ink receiving layer.

In a case of recording an image on a recording medium such as plain paper, an ink applied to the recording medium may adhere to and deposit on a member such as a conveyance roller. The ink adhered and deposited on the member such as a conveying roller may adhere to a printing surface of another recording medium and may cause contamination. In particular, in a case of a printer for commercial printing, since the number of printing sheets per single job is much larger than that of a printer for home use, it is required to prevent the ink from adhering to and being deposited on the member such as a conveying roller by improving fixability of the ink. For example, an ink jet ink in which a predetermined polyurethane resin particles are combined and a film is quickly formed on a recording medium, thereby being capable of recording an image with improved fastness such as scratch resistance has been proposed (Japanese Patent No. 5196235).

SUMMARY OF THE INVENTION

The present invention is to provide an aqueous ink capable of recording an image with excellent scratch resistance while having excellent intermittent ejection property. In addition, the present invention is to provide an ink cartridge and an image recording method which use the aqueous ink.

According to an aspect of the invention, there is provided an aqueous ink for ink jet, including a solvent A and a resin particle, in which the solvent A is alcohol of which aqueous solubility at 20° C. is 5% by mass or less, a vapor pressure at 20° C. is 0.5 mmHg or less and a surface tension at 20° C. is 30 mN/m or more, a content (% by mass) of the solvent A is 0.7 times or more to 7.0 times or less in terms of a ratio based on aqueous solubility (% by mass) of the solvent A at 20° C., and the amount of a surface anionic functional group of the resin particle is 0.55 mmol/g or more to 2.00 mmol/g or less.

In addition, according to another aspect of the invention, there is provided an ink cartridge including an ink and an ink storage portion that stores the ink, in which the ink is the above-described aqueous ink.

In addition, according to still another aspect of the invention, there is provided an image recording method including an ink applying step of ejecting the above-described aqueous ink from a recording head for ink jet to apply the aqueous ink on a recording medium conveyed under the recording head.

Further features of the present invention will become apparent from the following description of exemplary embodiments with reference to the attached drawing.

BRIEF DESCRIPTION OF THE DRAWINGS

FIGURE is a schematic diagram illustrating an example of an image recording apparatus used in an image recording method of the present invention.

DESCRIPTION OF THE EMBODIMENTS

The present inventors evaluated the intermittent ejection property of the ink in the related art. As a result, in both the inks proposed in the Japanese Patent Application Laid-Open No. H03-255171 and Japanese Patent Application Laid-Open No. 2000-297237, it was found that when moisture starts to evaporate, the inks are thickened over time at a tip portion of a nozzle and the intermittent ejection property tends to decrease. On the other hand, it was found that the ink proposed in Japanese Patent Application Laid-Open No. 2015-7175 exhibits effective intermittent ejection property. However, when evaluating the ink proposed in Japanese Patent Application Laid-Open No. 2015-7175 using a printer for commercial printing, which includes a conveying roller, it was found that the ink was likely to adhere to a surface of the conveying roller and image fastness was not sufficient.

Then, in order to improve fixability of the ink, the polyurethane resin particle combined in the ink proposed in Japanese Patent No. 5196235 was added to the ink proposed in the Japanese Patent Application Laid-Open No. 2015-7175. As a result, it was found that the intermittent ejection property tends to decrease. The general polyurethane resin particle has a small amount of a surface anionic functional group and low surface hydrophilic property (high hydrophobic property). Therefore, it was assumed that the poorly water-soluble compound was likely to be compatible with the polyurethane resin particle and the intermittent ejection property decreased. The poorly water-soluble compound is separated from the ink at the tip portion of the non-printing nozzle and forms an oil film to prevent the moisture in the ink from evaporating. However, it is considered that, when the poorly water-soluble compound is compatible with the polyurethane resin particle, the concentration of the poorly water-soluble compound in the ink is lowered, thereby becoming difficult to form the oil film and decreasing the intermittent ejection property.

The present inventors have conducted intensive studies on this problem, and have completed the present invention.

Hereinafter, the present invention will be described in more detail by giving preferred embodiments. In the present invention, in a case where a compound is salt, the salt exists in an ink by being dissociated to ions, but it is referred to as "contains salt" for convenience. In addition, an aqueous ink for ink jet may be referred to simply as an "ink". In addition, a physical property value is a value at 20° C. unless otherwise specified.

<Aqueous Ink>

An ink of the present invention is an aqueous ink for ink jet, containing a solvent A and a resin particle. Hereinafter, components forming the ink of the present invention, physical properties of the ink, or the like will be described in detail.

(Solvent A)

The solvent A used in the ink of the present invention is alcohol of which aqueous solubility at 20° C. is 5% by mass or less, a vapor pressure at 20° C. is 0.5 mmHg or less and a surface tension at 20° C. is 30 mN/m or more. The solvent A is difficult to soluble in water, which is so-called poorly water-soluble compound (poorly water-soluble solvent). The solvent A is a component that suppresses the evaporation of water and prevents viscosity of the ink from increasing and ink from sticking at the tip portion of the nozzle due to drying to improve the intermittent ejection property. When a concentration of solvent A rises by evaporation of water in the ink, the solvent A is not able to be completely dissolved in the ink, thereby being separated from the ink. Since the tip portion of the non-printing nozzle is exposed to an atmosphere, the water in the ink is particularly likely to volatilize. Therefore, at the tip portion of the non-printing nozzle, the solvent A separated from the ink forms an oil film to prevent the moisture in the ink from further evaporating. Accordingly, it is possible to improve the intermittent ejection property while being capable of ejecting the ink stably over a long time.

The aqueous solubility of the solvent A at 20° C. is 5% by mass or less, preferably 0.1% by mass or more to 3% by mass or less, more preferably 0.5% by mass or more to 3% by mass or less and particularly preferably 1% by mass or more to 3% by mass or less. When the aqueous solubility of the solvent A is 0.5% by mass or more, it is possible to dissolve the solvent A in a better state in the ink in an initial state (in a state before water evaporates).

The solvent A is preferably monovalent alcohol having a benzene ring. When the monovalent alcohol having a benzene ring is used as the solvent A, it is possible to disperse a pigment stably, which is preferable. An alcoholic hydroxy group may be directly bonded to the benzene ring or may be bonded to the benzene ring via another functional group. The solvent A is preferably at least one selected from the group consisting of phenoxyalkanol, phenylalkanol and aminophenol.

A vapor pressure of the solvent A at 20° C. is 0.5 mmHg or less and a surface tension thereof at 20° C. is 30 mN/m or more. When the vapor pressure is more than 0.5 mmHg, the oil film formed at the ejection orifice evaporates, thereby weakening the effect of suppressing the water evaporation. In addition, when the surface tension is less than 30 mN/m, an intermolecular force is weak. Therefore, it is not able to form the oil film. The vapor pressure of the solvent A at 20° C. is preferably 0.2 mmHg or less. In addition, the surface tension of the solvent A at 20° C. is preferably 36 mN/m or more. Specific examples of the solvent A are shown in Table 1. Among these, the solvent A is preferably one selected from the group consisting of benzyl alcohol, 2-phenoxyethanol, phenethyl alcohol, 1-phenoxy-2-propanol and 1-phenyl-2-propanol.

TABLE 1

Specific examples of solvent A

| | Aqueous solubility (% by mass) | Vapor pressure (mmHg) | Surface tension (mN/m) | Log distribution coefficient |
|---|---|---|---|---|
| 4-Phenyl-1-butanol | 0.1 | 0.0 | 38.3 | 2.4 |
| 3-Phenyl-1-propanol | 0.568 | 0.0 | 38.9 | 1.88 |
| 1-Phenyl-2-propanol | 0.58 | 0.1 | 37.3 | 1.71 |
| 1-Phenoxy-2-propanol | 1.1 | 0.0 | 37.7 | 1.51 |
| Phenethyl alcohol | 2.2 | 0.1 | 39.7 | 1.36 |
| 2-Phenoxyethanol | 2.67 | 0.0 | 40.0 | 1.16 |
| Benzyl alcohol | 4.29 | 0.1 | 39.0 | 1.03 |

The ink of the present invention may contain at least one solvent A and preferably contains only one solvent A. A content (% by mass) of the solvent A in the ink is 0.7 times or more to 7.0 times or less in terms of a ratio based on an aqueous solubility (% by mass) of the solvent A at 20° C. For example, a case in which solvent A is "2-phenoxyethanol" is assumed. In this case, since the aqueous solubility of the "2-phenoxyethanol" at 20° C. is "2.67% by mass", 1.87 to 18.69 g of the "2-phenoxyethanol" is contained in 100 g of the ink. In a case where the plural kinds of solvents A are contained in the ink, each solvent A is required to satisfy the ratio.

The ratio is set to 0.7 times or more, whereby it is possible to form the oil film having a sufficient volume at the tip portion of the non-printing nozzle and it is possible to suppress the evaporation of water in the ink. The content (% by mass) of the solvent A in the ink is preferably 1.0 time or more, more preferably 2.0 times or more and particularly preferably 3.0 times or more, in terms of a ratio based on the aqueous solubility (% by mass) of the solvent A at 20° C. Since the solvent A dissolves in a component (for example, a solvent B to be described later) other than water in the ink, it is possible to dissolve the solvent A in the ink, more than the aqueous solubility. However, when the ratio is more than 7.0, the solvent A remaining after dissolving is likely to remain inside the nozzle and an ejection defect is likely to occur. Therefore, the content (% by mass) of the solvent A in the ink is preferably 7.0 times or less, in terms of a ratio based on the aqueous solubility (% by mass) of the solvent A at 20° C.

(Resin Particle)

The ink of the present invention contains a resin particle. The amount of a surface anionic functional group of the resin particle is 0.55 mmol/g or more to 2.00 mmol/g or less and preferably 0.55 mmol/g or more to 1.50 mmol/g or less. It is possible to obtain the ink excellent in the intermittent ejection property, by causing the resin particle in which the amount of the surface anionic functional group is within the range to be contained.

The resin particle may be a particle in which the amount of the surface anionic functional group is within the range. As the resin particle, an acrylic resin particle or the like is possible to be used. The resin particle is preferably in a state of being dispersed in a medium, which is so-called resin emulsion. As specific examples of the resin particle, as a trade name, ZAIKTHENE L (manufactured by SUMITOMO SEIKA CHEMICALS CO., LTD., ethylene-(meth) acrylic acid based resin particle); KE-1060, PE-1304, KE-1062 and TE-1048 (which are manufactured by SEIKO PMC CORPORATION, styrene-acrylic acid based resin particle); PDX-7630A (manufactured by BASF, styrene-acrylic acid based resin particle) and the like are possible to be used.

The amount of a surface anionic functional group of the resin particle is able to be measured by colloid titration. In Examples to be described later, using a potential-difference automatic titrator (trade name "AT-510" manufactured by KYOTO ELECTRONICS MANUFACTURING CO., LTD.) on which a streaming potential titrating unit (trade name "PCD-500") is mounted, the amount of a surface anionic functional group of the resin particle was measured by colloid titration using a potential difference. Methyl glycol chitosan was used as a titrant.

In order to measure the amount of the surface anionic functional group of the resin particle in the ink containing a pigment, it is required to separate the pigment and the resin particle from each other. For example, the ink is centrifuged at 23° C. at 440,000 G for 2 hours to collect a supernatant containing the resin particle. Then, the amount of the surface anionic functional group is able to be measured by the measuring method.

The content (% by mass) of the resin particle in the ink is preferably 1.0% by mass or more to 7.0% by mass or less and more preferably 3.0% by mass or more to 7.0% by mass or less, based on the total mass of the ink. The content of the resin particle is within the range, thereby being able to further improve scratch resistance of an image.

(Coloring Material)

The ink of the present invention may be a colored ink containing a coloring material or a clear ink having no coloring material. As the coloring material, a dye or a pigment is possible to be used. As the dye or the pigment, a dye or a pigment known in the related art which is possible to be used in the ink for ink jet is possible to be used. Not only the dye or the pigment known in the related art but also a dye or a pigment which is newly discovered or synthesized is possible to be used.

[Dye]

A molecular structure and the like of the dye are not particularly limited and a soluble dye is preferably used. For example, the following a yellow dye, a magenta dye, a cyan dye and a black dye are able to be suitably used.

Examples of the yellow dye are possible to include:
(1) Acid dyes such as C.I. Acid yellow Nos. 1, 3, 7, 11, 17, 23, 25, 29, 36, 38, 40, 42, 44, 76, 98 and 99;
(2) Direct dyes such as C.I. Direct yellow Nos. 8, 11, 12, 27, 28, 33, 39, 44, 50, 58, 85, 86, 87, 88, 89, 98, 100, 110, 132 and 142;
(3) Reactive dyes such as C.I. Reactive yellow Nos. 2, 3, 17, 25, 37 and 42; and
(4) Food dyes such as C.I. Food yellow No. 3.

Examples of the magenta dye are possible to include:
(1) Acid dyes such as C.I. Acid red Nos. 6, 8, 9, 13, 14, 18, 26, 27, 32, 35, 37, 42, 51, 52, 80, 83, 87, 89, 92, 106, 114, 115, 133, 134, 145, 158, 198, 249, 265 and 289;
(2) Direct dyes such as C.I. Direct red Nos. 2, 4, 9, 11, 20, 23, 24, 31, 39, 46, 62, 75, 79, 80, 83, 89, 95, 197, 201, 218, 220, 224, 225, 226, 227, 228, 229 and 230;
(3) Reactive dyes such as C.I. Reactive red Nos. 7, 12, 13, 15, 17, 20, 23, 24, 31, 42, 45, 46 and 59; and
(4) Food dyes such as C.I. Food red Nos. 87, 92 and 94.

Examples of the cyan dye are possible to include:
(1) Acid dyes such as C.I. Acid blue Nos. 1, 7, 9, 15, 22, 23, 25, 29, 40, 43, 59, 62, 74, 78, 80, 90, 100, 102, 104, 117, 127, 138, 158 and 161;
(2) Direct dyes such as C.I. Direct blue Nos. 1, 15, 22, 25, 41, 76, 77, 80, 86, 87, 90, 98, 106, 108, 120, 158, 163, 168, 199 and 226; and
(3) Reactive dyes such as C.I. Reactive blue Nos. 4, 5, 7, 13, 14, 15, 18, 19, 21, 26, 27, 29, 32, 38, 40, 44 and 100.

Examples of the black dye are possible to include:
(1) Acid dyes such as C.I. Acid black Nos. 2, 48, 51, 52, 110, 115 and 156;
(2) Direct dyes such as C.I. Direct black Nos. 17, 19, 22, 31, 32, 51, 62, 71, 74, 112, 113, 154, 168 and 195;
(3) Reactive dyes such as C.I. Reactive black Nos. 1, 8, 12 and 13; and
(4) Food dyes such as C.I. Food black Nos. 1 and 2.

In addition to these, for example, C.I. Direct violet 107 (direct dye) or the like which is a violet dye is possible to be used.

[Pigment]

As the pigment, both an inorganic pigment and an organic pigment may be used. In addition, the pigment may be a natural pigment or a synthetic pigment.

Examples of the inorganic pigment are possible to include silica, alumina hydrate, titanium oxide, iron oxide and carbon black. Examples of carbon black include furnace black, lamp black, acetylene black and channel black.

Examples of the organic pigment are possible to include:
(1) Azo pigments such as azo lake, an insoluble azo pigment, a condensed azo pigment and a chelate azo pigment;
(2) Polycyclic pigments such as a phthalocyanine pigment, a perylene/perinone pigment, an anthraquinone pigment, a quinacridone pigment, a dioxazine pigment, a thioindigo pigment, an isoindolinone pigment and a quinophthalone pigment;

(3) Dye lakes such as basic dye lake and acid dye lake; and
(4) Pigments other than those of (1) to (3) such as a nitro pigment, a nitroso pigment, a aniline black and daylight fluorescent pigment.

When the organic pigment is exemplified by a color index (C.I.) number, examples are possible to include:
(1) Yellow pigments such as C.I. Pigment yellow Nos. 74, 93, 109, 110, 128 and 138;
(2) Magenta pigments such as C.I. Pigment red Nos. 122, 202 and 209;
(3) Cyan pigments such as C.I. Pigment blue Nos. 15:3 and 60;
(4) Black pigment such as C.I. Pigment black No. 7;
(5) Orange pigments such as C.I. Pigment orange Nos. 36 and 43; and
(6) Green pigments such as C.I. Pigment green Nos. 7 and 36.
However, as long as a pigment is dispersible in water, even pigments not listed in the color index are possible to be used.

When preparing the ink of the present invention, in addition to dry pigments such as powdery, granular and lumpy pigments, wet cake, slurry and the like of the pigments are possible to be used.

As the pigment, both a self-dispersible pigment and a resin-dispersible pigment may be used. However, it is preferable to use the self-dispersible pigment.

The self-dispersible pigment is able to be prepared by directly bonding a dispersibility imparting group to a particle surface of the pigment or indirectly binding the dispersibility imparting group to the particle surface of the pigment via a linking group such as an alkyl group, an alkyl ether group and an aryl group. The self-dispersible pigment is able to be dispersed in an aqueous solvent without adding a dispersant separately.

A kind of the dispersibility imparting group to be bonded to the particle surface of the pigment is not particularly limited and examples thereof are possible to include a carboxyl group (—COOH), a ketone group (—CO), a hydroxy group (—OH), a sulfonic acid group (—SO$_3$H) and a phosphoric acid group (—PO$_3$H$_2$).

An average particle diameter of the self-dispersible pigment is preferably 50 nm or more to 250 nm or less. The resin dispersed pigment having the average particle diameter within the range is used, thereby being able to further prevent the nozzle from being clogged while improving a storage stability of the ink. The average particle diameter of the self-dispersible pigment is able to be measured by a particle size analyzer using dynamic light scattering. Examples of the particle size analyzer are possible to include a fiber-optics particle analyzer (trade name "F-PAR 1000", manufactured by OTSUKA ELECTRONICS Co., LTD).

As the self-dispersible pigment, a self-dispersible black pigment, a self-dispersible cyan pigment, a self-dispersible magenta pigment and a self-dispersible yellow pigment are possible to be used. Examples of the self-dispersible black pigment are possible to include, as a trade name, CAB-O-JET 400, CAB-O-JET 300 and CAB-O-JET 200 (which are manufactured by Cabot Corporation). Examples of the self-dispersible cyan pigment are possible to include, as a trade name, CAB-O-JET 250C, 450C and 554B (which are manufactured by Cabot Corporation). Examples of the self-dispersible magenta pigment are possible to include, as a trade name, CAB-O-JET 260M, 265M and 465M (which are manufactured by Cabot Corporation). Examples of the self-dispersible yellow pigment are possible to include, as a trade name, CAB-O-JET 270Y, 470Y and 740Y (which are manufactured by Cabot Corporation).

A content of the coloring material in the ink is not particularly limited and may be appropriately determined according to the kind of the coloring material, required property of the ink and the like. Specifically, the content of the coloring material in the ink is preferably 1.0% by mass or more to 7.0% by mass or less, based on the total mass of the ink. The content of the coloring material is set to 1.0% by mass or more, thereby being able to further increase an optical density of an image to be recorded. In addition, the content of the coloring material is set to 7.0% by mass or less, thereby being able to further increase preservability or ejection property of the ink.

(Solvent B)

The ink of the present invention preferably further contains a solvent B which is likely to soluble in water, which is a so-called easily water-soluble compound (easily water-soluble solvent). The solvent B is a component that suppresses the evaporation of water and prevents viscosity of the ink from increasing and ink from sticking at the tip portion of the nozzle due to drying to improve the intermittent ejection property, like the solvent A. In addition, the solvent B has high moisture retention (hydration power). Thus, the solvent B is capable of suppressing the evaporation of water in the ink and preventing viscosity of the ink from increasing and ink from sticking to the nozzle due to drying. Accordingly, the solvent B is contained, whereby it is possible to further improve the intermittent ejection property while being capable of ejecting the ink stably over a long time. In addition, the solvent B has high affinity with the coloring material. Thus, it is possible to improve dispersion stability of the ink. The aqueous solubility of the solvent B at 20° C. is 20% by mass or more. As the solvent B, it is preferable to use polyhydric alcohol and ureas.

The polyhydric alcohol is a compound (alkane polyol) having a structure in which two or more hydrogen atoms that form linear or branched aliphatic hydrocarbon are substituted with a hydroxy group. In addition, the polyhydric alcohol includes condensate (such as diethylene glycol) of the alkane polyol and a compound (such as thiodiglycol) in which an ether oxygen atom of the condensate is substituted with a sulfur atom. Among the polyhydric alcohols, the polyhydric alcohol used as an aqueous organic solvent is preferred.

Examples of the polyhydric alcohol are possible to include: alkane diols such as ethylene glycol (ethanediol), (1,2- or 1,3-)propanediol, (1,2-, 1,3- or 1,4-)butanediol, (1,2-, 1,3-, 1,4- or 1,5-)pentanediol and (1,2-, 1,3-, 1,4-, 1,5- or 1,6-)hexane diol; alkanetriols such as glycerin and 1,2,6-hexanetriol; and condensates of alkane polyols such as diethylene glycol, triethylene glycol, tetraethylene glycol, dipropylene glycol, tripropylene glycol, polyethylene glycol, polypropylene glycol and thiodiglycol. As the solvent B, it is preferable to use one selected from the group consisting of glycerin, triethylene glycol, ethylene glycol, diethylene glycol, propylene glycol, methyl carbitol, 2-pyrrolidone and carbitol.

Ureas are compounds having a urea skeleton (structure in which two nitrogen atoms are bonded to both ends of carbonyl carbon). Examples of the ureas are possible to include ethylene urea in addition to urea. These compounds are an aqueous compound which is solid at 20° C., but exhibit the same effect as the polyhydric alcohols by dissolving in water.

The content (% by mass) of the solvent B in the ink is preferably 3.0% by mass or more to 15.0% by mass or less, based on the total mass of the ink.

(Water)

The ink of the present invention is an aqueous ink containing water as a medium. As the water, it is preferable to use deionized water (ion exchanged water). The content (% by mass) of the water in the ink is preferably 70% by mass or more to 90% by mass or less and more preferably 72% by mass or more to 89% by mass or less, based on the total mass of the ink.

(Other Additives)

The ink of the present invention is possible to contain an additive in addition to the respective components. Examples of such additives are possible to include a surfactant, an antifungal agent, a surface tension regulator, a pH adjuster, a rust inhibitor, a preservative, an antioxidant, a reducing inhibitor and a salt.

As the surfactant, a surfactant used in the ink of the related art, for ink jet is possible to be used. The content (% by mass) of the surfactant in the ink is preferably 0.05% by mass or more to 2% by mass or less and more preferably 0.05% by mass or more to 1% by mass or less, based on the total mass of the ink. The content of the surfactant is set to 0.05% by mass or more, thereby being able to improve wettability of the ink in the nozzle and to further improve ejection stability. In addition, the content of the surfactant is set to 2% by mass or less, thereby being able to further reduce the viscosity increase of the ink in which moisture has evaporated at the tip portion of the nozzle and to further improve the intermittent ejection property.

Examples of the surfactant are possible to include a nonionic surfactant, an anionic surfactant, a fluorine surfactant, an acetylene glycol surfactant and silicon surfactant.

Examples of the nonionic surfactant are possible to include, as a trade name, EMULGEN 103, EMULGEN 108, EMULGEN 123P, AMIET and EMASOL (which are manufactured by Kao Corporation); NOIGEN, EPAN and SORGEN (which are manufactured by DKS Co. Ltd.); and NAROACTY, EMULMIN and SANNONIC (which are manufactured by Sanyo Chemical Industries, Ltd.).

Examples of the anionic surfactant are possible to include, as a trade name, EMAL, LATEMUL, PELEX, NEOPELEX and DEMOL (which are manufactured by Kao Corporation); SUNNOL, LIPOLAN, UPON and LIPAL (which are manufactured by Lion Corporation).

Examples of the fluorine surfactant are possible to include, as a trade name, MEGAFACE F-114, F-410, F-440, F-447, F-553 and F-556 (which are manufactured by DIC Corporation); and SURFLON S-211, S-221, S-231, S-233, S-241, S-242, S-243, S-420, S-661, S-651 and S-386 (which are manufactured by AGC SEIMI CHEMICAL CO., LTD.).

Examples of the acetylene glycol surfactant are possible to include, as a trade name, SURFYNOL 104, 82, 420, 440, 465, 485, TG and 2502, DYNOL 604, 607 and 800 (which are manufactured by Air Products and Chemicals Inc.) and OLFINE E1004, E1010, PD004 and EXP4300 (which are manufactured by Nisshin Chemical Industry Co. Ltd.); and ACETYLENOL EH, E40, E60, E81, E100 and E 200 (which are manufactured by Kawaken Fine Chemicals Co., Ltd.).

Examples of silicon surfactant are possible to include, as a trade name, FZ-2122, FZ-2110, FZ-7006, FZ-2166, FZ-2164, FZ-7001, FZ-2120, SH 8400, FZ-7002, FZ-2104, 8029 ADDITIVE, 8032 ADDITIVE, 57 ADDITIVE, 67 ADDITIVE and 8616 ADDITIVE (which are manufactured by Dow Corning Toray Co., Ltd.); KF-6012, KF-6015, KF-6004, KF-6013, KF-6011, KF-6043 and KP-104, 110, 112, 323, 341 and 6004 (which are manufactured by Shin-Etsu Chemical Co., Ltd.); and BYK-300/302, BYK-306, BYK-307, BYK-320, BYK-325, BYK-330, BYK-331, BYK-333, BYK-337, BYK-341, BYK-344, BYK-345/346, BYK-347, BYK-348, BYK-375, BYK-377, BYK-378, BYK-UV3500, BYK-UV3510, BYK-310, BYK-315, BYK-370, BYK-UV3570, BYK-322, BYK-323, BYK-350, BYK-352, BYK-354, BYK-355, BYK-358N/361N, BYK-380N, BYK-381, BYK-392, BYK-340, BYK-Silclean3700 and BYK-Dynwet800 (which are manufactured by BYK Additives & Instruments). One kind of these surfactants is possible to be used alone and two or more kinds thereof are possible to be used in combination.

As the antifungal agent, it is possible to use, for example, benzisothiazolin-3-one (trade name "PROXEL XL-2(S)" manufactured by Lonza Japan). The content (% by mass) of the antifungal agent in the ink is preferably 0.01% by mass or more to 0.1% by mass or less, based on the total mass of the ink.

As the surface tension regulator, it is possible to use, for example, 1,2-hexanediol. The content (% by mass) of the surface tension regulator in the ink is preferably 1% by mass or more to 5% by mass or less, based on the total mass of the ink.

<Ink Cartridge>

An ink cartridge of the present invention includes an ink storage portion that stores the ink. Then, the aqueous ink of the present invention described above is stored in the ink storage portion. As a form of the ink cartridge, there are (i) a form of directly storing the ink in the ink storage portion; (ii) a form in which a member or mechanism for generating a negative pressure is housed in the ink storage portion and the ink is held by the member or the like to be stored; and the like. In the form of (ii), there are (ii-1) a form in which the member or mechanism for generating a negative pressure is housed in the entire ink storage portion; (ii-2) a form in which an interior of the ink storage portion is partitioned by a chamber for directly containing the ink and a chamber for housing the member or the like for generating negative pressure; and the like.

In the form of (i), the recording head and the ink storage portion are connected by an ink supply portion such as a tube and the ink is supplied to the recording head using a water head difference, a pump or the like. In addition, the ink cartridge having the form of (ii) is detachably connected to an upper portion of the recording head and supplies ink to the recording head using negative pressure generated by the member or the like for generating negative pressure. The ink cartridge integrated with the recording head is also included in concept of the ink cartridge of the present invention.

<Image Recording Method>

An image recording method of the present invention includes an ink applying step of ejecting the aqueous ink of the present invention described above from the recording head for ink jet to apply the aqueous ink on a recording medium conveyed under the recording head. In addition, the image recording method of the present invention preferably further includes a conveying step of conveying the recording medium and a heating step of heating the recording medium to which the ink is applied.

FIGURE is a schematic diagram illustrating an example of an image recording apparatus used in an image recording method of the present invention. In the image recording apparatus illustrated in the FIGURE, a form in which using a recording medium wound in a roll shape, the recording medium on which an image is recorded is wound up in a roll shape again is illustrated. That is, the image recording apparatus illustrated in the FIGURE includes a recording medium supply unit 1, an ink applying unit 2, a heating unit 3 and a recording medium recovery unit 4. The recording medium supply unit 1 is a unit for holding and supplying the recording medium wound in a roll shape. The ink applying unit 2 is a unit for applying the ink to the recording medium sent from the recording medium supply unit 1. The heating unit 3 is a unit for heating the recording medium to which the ink is applied. The recording medium recovery unit 4 is a unit for winding up the recording medium on which an image is recorded by applying the ink. The recording medium is conveyed along a conveying path indicated by a solid line in the FIGURE by a conveying unit including a conveying member such as a pair of rollers (conveying rollers 5 and 6), a belt or the like and is processed in each unit. The recording medium wound in a roll shape in the recording medium recovery unit 4 is supplied to another apparatus or the like and processing such as cutting the recording medium to a desired size or binding the recording medium may be performed.

A conveying speed of the recording medium in the conveying step is preferably 50 m/min or more and more preferably 100 m/min or more. In the conveying step, it is preferable to apply tension to the recording medium. That is, it is preferable to provide a tension imparting unit that generates tension to the image recording apparatus. Specifically, it is possible to provide a tension imparting unit that imparts tension to the recording medium or tension controller that controls tension of the recording medium to a conveying mechanism between the recording medium supply unit 1 and the recording medium recovery unit 4 (FIGURE). When the tension is imparted (applied) to the recording medium, it is possible to effectively prevent the recording medium from deforming (such as curling and cockling) during recording or after drying. The tension imparted to the recording medium is preferably 20 N/m or more to 100 N/m or less.

(Ink Applying Step)

The ink applying step is a step for applying the ink to the recording medium. As a method of applying the ink to the recording medium, an ink jet method is adopted. That is, the image recording method of the present invention is an ink jet recording method. The ink jet method may be a thermal ink jet method and may also be a piezo ink jet method. The thermal ink jet method is a method of ejecting the ink from the ejection orifice of the recording head by applying thermal energy to the ink. In addition, the piezo ink jet method is a method of ejecting the ink from the ejection orifice of the recording head by using a piezo element.

The recording head may be a serial type recording head and may also be a full line type recording head. The serial type recording head is a recording head that records an image by the recording head being scanned in a direction intersecting a conveying direction of the recording medium. In addition, the full line type recording head is a recording head in which a plurality of nozzles is arranged in a range covering the maximum width of the recording medium. Since an image is possible to be recorded at a higher speed, it is preferable to use the full line type ink jet recording head. In the full line type ink jet recording head, it is preferable that nozzle rows are arranged in a direction perpendicular to the conveying direction of the recording medium. In addition, a plurality of full line type ink jet recording heads is generally provided for each color of an ink and it is preferable that the respective recording heads are arranged in parallel in order along the conveying direction of the recording medium. In general, a clear ink is further applied onto the colored ink previously applied to the recording medium.

(Heating Step)

A heating step is a step of heating the recording medium to which the ink is applied so as to have a surface temperature of 70° C. or higher. In the present invention, an expression "surface temperature of a recording medium to which an ink is applied" means a surface temperature of the recording medium at a position conveyed for 0.5 seconds in a case where a time at which the ink is applied to the recording medium is regarded as 0 seconds. For example, the conveying speed of the recording medium is assumed by "V" m/min. In a case of assuming like this, the surface temperature of an applied region X at a position where the applied position X of the ink in the recording medium has moved along the conveying direction from the position where the ink was applied by "(V×0.5)/60" m may be measured. The "position where the ink was applied" in a case of the full line type ink jet recording head means a position right under the recording head. In Example, the surface temperature of the recording medium was measured at a position 10 cm away from the surface in an approximately perpendicular direction using a non-contact infrared thermometer (trade name "Digital Infrared Temperature Sensor FT-H20" manufactured by KEYENCE CORPORATION).

When heating the recording medium, for example, the recording medium may be pressed using a pressure roller or the like. The recording medium is pressed, thereby being able to improve fixability of an image. When pressing the recording medium, the recording medium may not be pressed over the entire process of the heating step and may be pressed only in a partial process of the heating step. In addition, the recording medium may be pressed in multiple stages. A pressing step may be provided after the heating step.

(Recording Medium)

As the recording medium, it is possible to use any recording medium generally used in the related art. Examples of the recording medium are possible to include: plain paper or glossy paper which is a permeable recording medium; printing paper which is a hardly permeable recording medium; and glass, plastic, film or the like which is an impermeable recording medium.

The recording medium may be cut to a desired size in advance or may be a long medium wound in a roll shape to be cut to a desired size after recording an image. Among these, since it is easy to impart tension, it is preferable to use a long recording medium wound in a roll shape.

According to the present invention, it is possible to provide an aqueous ink capable of recording an image with excellent scratch resistance while having excellent intermittent ejection property. In addition, according to the present invention, it is possible to provide an ink cartridge and an image recording method which use the aqueous ink.

EXAMPLES

Hereinafter, the present invention will be described in more detail by giving Examples and Comparative Examples, but the present invention is not limited to the following Examples unless the gist thereof is exceeded. The amount of a component represented by "part" and "%" is on a mass basis unless otherwise specified.

<Preparation of Ink>

(Ink 1)

33.5 parts of magenta aqueous pigment dispersion (solid content: 14.9%), 1.9 parts of 2-phenoxyethanol, 5.0 parts of propylene glycol, 2.0 parts of polyolefin resin particle dispersion (solid content: 50.0%) and 0.2 parts of surfactant were put into a container. As the magenta aqueous pigment dispersion, a trade name of "CAB-O-JET 465M" (manufactured by Cabot Corporation) was used. As the polyolefin resin particle dispersion, a trade name of "ZAIKTHENE L (manufactured by SUMITOMO SEIKA CHEMICALS CO., LTD.) was used. In addition, as the surfactant, the acetylene glycol surfactant (trade name "DYNOL 800" manufactured by Air Products and Chemicals Inc.) was used. Further, pure water (ion exchanged water) was added to make the total 100 parts. After stirring for 30 minutes, the ink 1 was prepared by filtration through a membrane filter having a pore size of 1 µm. The aqueous solubility of the solvent A (2-phenoxyethanol) in the prepared ink 1 was 2.7% and a value of the "content (%) of solvent A/aqueous solubility (%) of solvent A" was 0.7.

(Inks 2 to 48)

Inks 2 to 48 were prepared in the same manner as in the case of the ink 1, except that the composition was set as shown in the upper rows (unit: part) of Tables 3-1 to 3-3 and 4-1 and 4-2. The aqueous solubility of the solvent A in each prepared ink and a value of "content (%) of solvent A/aqueous solubility (%) of solvent A" were shown in lower rows of Tables 3-1 to 3-3 and 4-1 and 4-2. In addition, details of each used component were shown in Table 2 and the following.

TABLE 2

| Resin particle | | | |
|---|---|---|---|
| | Trade name | Manufacturer | Amount of surface anionic functional group (mmol/g) |
| Silicon resin particle | IE7170 | Dow Corning | 0.07 |
| Acrylic resin particle | CM8430 | DIC | 0.12 |
| Urethane resin particle | W5661 | Mitsui Chemicals | 0.39 |
| Acrylic resin particle | PDX-7643 | BASF | 0.48 |
| Polyolefin resin particle | DB4010 | Unitika | 0.54 |
| Acrylic resin particle | ZAIKTHENE L | Sumitomo Seika Chemicals | 0.59 |
| Acrylic resin particle | KE1060 | Seiko PMC | 0.61 |
| Acrylic resin particle | PE1304 | Seiko PMC | 0.92 |
| Acrylic resin particle | KE1062 | Seiko PMC | 1.11 |
| Acrylic resin particle | TE1048 | Seiko PMC | 1.45 |
| Acrylic resin particle | PDX7630A | BASF | 1.90 |

[Pigment]

COJ465M: Magenta aqueous pigment dispersion (a trade name of "CAB-O-JET 465M", manufactured by Cabot Corporation and solid content: 14.9%)

COJ400: the Black aqueous pigment dispersion, (a trade name of "CAB-O-JET 400" manufactured by Cabot Corporation and solid content: 14.9%)

[Surfactant]

DYNOL 800: Acetylene glycol surfactant (manufactured by Air Products and Chemicals Inc.)

ACETYLENOL E40: Acetylene glycol surfactant (manufactured by Kawaken Fine Chemicals Co., Ltd)

TABLE 3-1

| | | Composition of ink | | | | | | | | | | |
|---|---|---|---|---|---|---|---|---|---|---|---|---|
| | | Ink | | | | | | | | | | |
| | | 1 | 2 | 3 | 4 | 5 | 6 | 7 | 8 | 9 | 10 | 11 |
| Pigment | COJ465M | 5.0 | 5.0 | 5.0 | 5.0 | 5.0 | 5.0 | 5.0 | 5.0 | 5.0 | 5.0 | 5.0 |
| | COJ400 | | | | | | | | | | | |
| Surfactant | DYNOL 800 | 0.2 | 0.2 | 0.2 | 0.2 | 0.2 | 0.2 | 1.0 | 0.2 | 0.2 | 0.2 | 0.2 |
| | ACETYLENOL E40 | | | | | | | | | | | |
| Solvent A | 2-Phenoxyethanol | 1.9 | 10.0 | 10.0 | 18.9 | 10.0 | 10.0 | 10.0 | 10.0 | 10.0 | 10.0 | 10.0 |
| | 1-Phenoxy-2-propanol | | | | | | | | | | | |
| | Benzyl alcohol | | | | | | | | | | | |
| | Phenethyl alcohol | | | | | | | | | | | |
| | 3-Phenyl-1-propanol | | | | | | | | | | | |
| Solvent B | Propylene glycol | 5.0 | 5.0 | 5.0 | 5.0 | 5.0 | 12.0 | 5.0 | 5.0 | 5.0 | 5.0 | 5.0 |
| | Glycerin | | | | | | | | | | | |
| | Triethylene glycol | | | | | | | | | | | |
| | Ethylene glycol | | | | | | | | | | | |
| | Diethylene glycol | | | | | | | | | | | |
| | 2-Pyrrolidone | | | | | | | | | | | |
| | Carbitol | | | | | | | | | | | |
| Resin particle* | ZAIKTHENE L (0.59) | 1.0 | 5.0 | 7.0 | 7.0 | 1.0 | 5.0 | 5.0 | | | | |
| | KE1060 (0.61) | | | | | | | | 5.0 | | | |
| | PE1304 (0.92) | | | | | | | | | 5.0 | | |
| | KE1062 (1.11) | | | | | | | | | | 5.0 | |
| | TE1048 (1.45) | | | | | | | | | | | 5.0 |
| | PDX7630A (1.90) | | | | | | | | | | | |

TABLE 3-1-continued

Composition of ink

| | Ink 1 | Ink 2 | Ink 3 | Ink 4 | Ink 5 | Ink 6 | Ink 7 | Ink 8 | Ink 9 | Ink 10 | Ink 11 |
|---|---|---|---|---|---|---|---|---|---|---|---|
| Aqueous solubility of solvent A (% by mass) | 2.7 | 2.7 | 2.7 | 2.7 | 2.7 | 2.7 | 2.7 | 2.7 | 2.7 | 2.7 | 2.7 |
| Content of solvent A (% by mass)/aquous solubulity of solvent A (% by mass) | 0.7 | 3.7 | 3.7 | 7.0 | 3.7 | 3.7 | 3.7 | 3.7 | 3.7 | 3.7 | 3.7 |

*Numeric values in parentheses indicate the amount of surface anionic functional group (mmol/g)

TABLE 3-2

Composition of ink

| | | Ink 12 | Ink 13 | Ink 14 | Ink 15 | Ink 16 | Ink 17 | Ink 18 | Ink 19 | Ink 20 | Ink 21 | Ink 22 |
|---|---|---|---|---|---|---|---|---|---|---|---|---|
| Pigment | COJ465M | 5.0 | 5.0 | 5.0 | 5.0 | 5.0 | 5.0 | 5.0 | 5.0 | 5.0 | 5.0 | 5.0 |
| | COJ400 | | | | | | | | | | | |
| Surfactant | DYNOL 800 | 0.2 | 0.2 | 0.2 | 0.2 | 0.2 | 0.2 | 0.2 | 0.2 | 0.2 | 0.2 | 0.2 |
| | ACETYLENOL E40 | | | | | | | | | | | |
| Solvent A | 2-Phenoxyethanol | 10.0 | | | | | | | | | | |
| | 1-Phenoxy-2-propanol | | 0.8 | 3.3 | 7.7 | | | | 5.5 | 5.5 | 5.5 | 5.5 |
| | Benzyl alcohol | | | | | 12.9 | | | | | | |
| | Phenethyl alcohol | | | | | | 6.6 | | | | | |
| | 3-Phenyl-1-propanol | | | | | | | 3.0 | | | | |
| Solvent B | Propylene glycol | 5.0 | 5.0 | 5.0 | 5.0 | 5.0 | 5.0 | 5.0 | 5.0 | 5.0 | 5.0 | 5.0 |
| | Glycerin | | | | | | | | | | | |
| | Triethylene glycol | | | | | | | | | | | |
| | Ethylene glycol | | | | | | | | | | | |
| | Diethylene glycol | | | | | | | | | | | |
| | 2-Pyrrolidone | | | | | | | | | | | |
| | Carbitol | | | | | | | | | | | |
| Resin particle* | ZAIKTHENE L (0.59) | | 1.0 | 3.0 | 5.0 | 5.0 | 5.0 | 5.0 | 5.0 | | | |
| | KE1060 (0.61) | | | | | | | | | 5.0 | | |
| | PE1304 (0.92) | | | | | | | | | | | |
| | KE1062 (1.11) | | | | | | | | | | 5.0 | |
| | TE1048 (1.45) | | | | | | | | | | | 5.0 |
| | PDX7630A (1.90) | 5.0 | | | | | | | | | | |
| Aqueous solubility of solvent A (% by mass) | | 2.7 | 1.1 | 1.1 | 1.1 | 4.3 | 2.2 | 0.6 | 1.1 | 1.1 | 1.1 | 1.1 |
| Content of solvent A (% by mass)/aquous solubility of solvent A (% by mass) | | 3.7 | 0.7 | 3.0 | 7.0 | 3.0 | 3.0 | 5.3 | 5.0 | 5.0 | 5.0 | 5.0 |

*Numeric values in parentheses indicate the amount of surface anionic functional group (mmol/g)

TABLE 3-3

Composition of ink

| | | Ink 23 | Ink 24 | Ink 25 | Ink 26 | Ink 27 | Ink 28 | Ink 29 | Ink 30 | Ink 31 |
|---|---|---|---|---|---|---|---|---|---|---|
| Pigment | COJ465M | 5.0 | 5.0 | 5.0 | 5.0 | 5.0 | 5.0 | 5.0 | | |
| | COJ400 | | | | | | | | 5.0 | |
| Surfactant | DYNOL 800 | 0.2 | | 0.2 | 0.2 | 0.2 | 0.2 | 0.2 | 0.2 | 0.2 |
| | ACETYLENOL E40 | | 0.1 | | | | | | | |
| Solvent A | 2-Phenoxyethanol | 8.0 | 8.0 | 8.0 | 8.0 | 8.0 | 8.0 | 8.0 | 8.0 | 8.0 |
| | 1-Phenoxy-2-propanol | | | | | | | | | |
| | Benzyl alcohol | | | | | | | | | |
| | Phenethyl alcohol | | | | | | | | | |
| | 3-Phenyl-1-propanol | | | | | | | | | |
| Solvent B | Propylene glycol | | | | | | | | 5.0 | 5.0 |
| | Glycerin | 5.0 | 5.0 | | | | | | | |
| | Triethylene glycol | | | 5.0 | | | | | | |

TABLE 3-3-continued

| | Composition of ink | | | | | | | | | |
|---|---|---|---|---|---|---|---|---|---|---|
| | | Ink | | | | | | | | |
| | | 23 | 24 | 25 | 26 | 27 | 28 | 29 | 30 | 31 |
| | Ethylene glycol | | | | 5.0 | | | | | |
| | Diethylene glycol | | | | | 5.0 | | | | |
| | 2-Pyrrolidone | | | | | | 5.0 | | | |
| | Carbitol | | | | | | | 5.0 | | |
| Resin particle* | ZAIKTHENE L (0.59) | 5.0 | 5.0 | 5.0 | 5.0 | 5.0 | 5.0 | 5.0 | 5.0 | 5.0 |
| | KE1060 (0.61) | | | | | | | | | |
| | PE1304 (0.92) | | | | | | | | | |
| | KE1062 (1.11) | | | | | | | | | |
| | TE1048 (1.45) | | | | | | | | | |
| | PDX7630A (1.90) | | | | | | | | | |
| Aqueous solubility of solvent A(% by mass) | | 2.7 | 2.7 | 2.7 | 2.7 | 2.7 | 2.7 | 2.7 | 2.7 | 2.7 |
| Content of solvent A (% by mass)/aquous solubulity of solvent A (% by mass) | | 3.0 | 3.0 | 3.0 | 3.0 | 3.0 | 3.0 | 3.0 | 3.0 | 3.0 |

*Numeric values in parentheses indicate the amount of surface anionic functional group (mmol/g)

TABLE 4-1

| | Composition of ink | | | | | | | | | |
|---|---|---|---|---|---|---|---|---|---|---|
| | | Ink | | | | | | | | |
| | | 32 | 33 | 34 | 35 | 36 | 37 | 38 | 39 | 40 |
| Pigment | COJ465M | 5.0 | 5.0 | 5.0 | 5.0 | 5.0 | 5.0 | 5.0 | 5.0 | 5.0 |
| | COJ400 | | | | | | | | | |
| Surfactant | DYNOL 800 | 0.2 | 0.2 | 0.2 | 0.2 | 0.2 | 0.2 | 0.2 | 0.2 | 0.2 |
| | ACETYLENOL E40 | | | | | | | | | |
| Solvent A | 2-Phenoxyethanol | 10.0 | 10.0 | 10.0 | 10.0 | 10.0 | 1.4 | 1.4 | 1.4 | |
| | 1-Phenoxy-2-propanol | | | | | | | | | 0.6 |
| | Benzyl alcohol | | | | | | | | | |
| | Phenethyl alcohol | | | | | | | | | |
| | 3-Phenyl-1-propanol | | | | | | | | | |
| Solvent B | Propylene glycol | 5.0 | 5.0 | 5.0 | 5.0 | 5.0 | 5.0 | 5.0 | 5.0 | 5.0 |
| | Glycerin | | | | | | | | | |
| | Triethylene glycol | | | | | | | | | |
| | Ethylene glycol | | | | | | | | | |
| | Diethylene glycol | | | | | | | | | |
| | 2-Pyrrolidone | | | | | | | | | |
| | Carbitol | | | | | | | | | |
| Resin particle* | IE7170 (0.07) | 5.0 | | | | | | | | |
| | CM8430 (0.12) | | 5.0 | | | | | | | |
| | W5661 (0.39) | | | 5.0 | | | | | | |
| | PDX-7643 (0.48) | | | | 5.0 | | | | | |
| | DB4010 (0.54) | | | | | 5.0 | | | | |
| | ZAIKTHENE L (0.59) | | | | | | 5.0 | | | 5.0 |
| | KE1060 (0.61) | | | | | | | 5.0 | | |
| | PE1304 (0.92) | | | | | | | | 5.0 | |
| | KE1062 (1.11) | | | | | | | | | |
| | TE1048 (1.45) | | | | | | | | | |
| | PDX7630A (1.90) | | | | | | | | | |
| Aqueous solubility of solvent A(% by mass) | | 2.7 | 2.7 | 2.7 | 2.7 | 2.7 | 2.7 | 2.7 | 2.7 | 1.1 |
| content of solvent A (% by mass)/aquous solubulity of solvent A (% by mass) | | 3.7 | 3.7 | 3.7 | 3.7 | 3.7 | 0.5 | 0.5 | 0.5 | 0.5 |

*Numeric values in parentheses indicate the amount of surface anionic functional group (mmol/g)

TABLE 4-2

| | | Ink | | | | | | | |
|---|---|---|---|---|---|---|---|---|---|
| | | 41 | 42 | 43 | 44 | 45 | 46 | 47 | 48 |
| Pigment | COJ465M | 5.0 | 5.0 | 5.0 | 3.0 | 3.0 | 5.0 | | |
| | COJ400 | | | | | | | 5.0 | |
| Surfactant | DYNOL 800 | 0.2 | 0.2 | 0.2 | 0.2 | 0.2 | 0.2 | 0.2 | 0.2 |
| | ACETYLENOL E40 | | | | | | | | |
| Solvent A | 2-Phenoxyethanol | | | | | | 3.0 | 8.0 | 8.0 |
| | 1-Phenoxy-2-propanol | 0.6 | 0.6 | | 2.5 | 2.5 | | | |
| | Benzyl alcohol | | | | | | | | |
| | Phenethyl alcohol | | | 1.1 | | | | | |
| | 3-Phenyl-1-propanol | | | | | | | | |
| Solvent B | Propylene glycol | 5.0 | 5.0 | 5.0 | | | 5.0 | 5.0 | 5.0 |
| | Glycerin | | | | 2.5 | 2.5 | | | |
| | Triethylene glycol | | | | | | | | |
| | Ethylene glycol | | | | | | | | |
| | Diethylene glycol | | | | | | | | |
| | 2-Pyrrolidone | | | | | | | | |
| | Carbitol | | | | | | | | |
| Resin particle* | IE7170 (0.07) | | | | | | | | |
| | CM8430 (0.12) | | | | | | | | |
| | W5661 (0.39) | | | | | | | | |
| | PDX-7643 (0.48) | | | | | 5.0 | | | |
| | DB4010 (0.54) | | | | | | | | |
| | ZAIKTHENE L (0.59) | | | | | | | | |
| | KE1060 (0.61) | 5.0 | | | | | | | |
| | PE1304 (0.92) | | 5.0 | | | | | | |
| | KE1062 (1.11) | | | 5.0 | | | | | |
| | TE1048 (1.45) | | | | | | | | |
| | PDX7630A (1.90) | | | | | | | | |
| Aqueous solubility of solvent A (% by mass) | | 1.1 | 1.1 | 2.2 | 1.1 | 1.1 | 2.7 | 2.7 | 2.7 |
| content of solvent A (% by mass)/aqueous solubility of solvent A (% by mass) | | 0.5 | 0.5 | 0.5 | 2.3 | 2.3 | 1.1 | 3.0 | 3.0 |

*Numeric values in parentheses indicate the amount of surface anionic functional group (mmol/g)

<Evaluation>

An ink jet recording apparatus which has a configuration illustrated in the FIGURE and includes the recording head was prepared. An image was recorded using the piezo ink jet recording head (trade name "KJ 4" manufactured by KYOCERA Corporation and nozzle density of 600 dpi) as the recording head. Recording conditions were set to be temperature of 25° C., relative humidity of 55% and ink ejection frequency of 39 kHz. In addition, the conveying speed of the recording medium was set to 75 m/min and a volume of ink ejected per dot was set to approximately 13 pL. A ratio (Conveying speed/Recording resolution) of the conveying speed of the recording medium to a recording resolution was 0.125 m/min·dpi and the amount of applied ink per 1 $cm^2$ was 0.8 mg. In the ink jet recording apparatus, a condition for applying one dot of 13 ng of ink droplets to a unit region of 1/600 inch×1/600 inch at a resolution of 600 dpi×600 dpi was defined as "recording duty 100%". The surface temperature of the recording medium to which the ink has been applied was measured at a position 10 cm away from the surface of the recording medium in an approximately perpendicular direction using a non-contact infrared thermometer (trade name "Digital Infrared Temperature Sensor FT-H20" manufactured by KEYENCE CORPORATION).

(Intermittent Ejection Property)

An image having a size of 1 inch×1 inch was recorded on pure paper (trade name "OK Prince quality" manufactured by Oji Paper Co., Ltd., basis weight of 64 $g/m^2$ and thickness of 0.07 mm) using the ink jet recording apparatus. After pausing the ink jet recording apparatus for a predetermined time, an ink was ejected only once from the nozzle of the recording head. When the ink was normally ejected, a line having the same 1 inch length as the nozzle row was recorded. The recorded line was visually observed and intermittent ejection property was evaluated in accordance with the following evaluation criteria. In the following evaluation criteria, "A" and "B" were regarded as preferable levels and "C" was regarded as an unacceptable level. The results thereof were shown in Tables 5 and 6.

A: Even when the pausing time is 10 minutes or more, an ink was normally ejected from more than half of the entire nozzles.

B: When the pausing time was 120 seconds or more to less than 10 minutes, an ink was ejected normally from more than half of the entire nozzles.

C: When the pausing time reached 30 seconds or more, an ink was not normally ejected from more than half of the entire nozzles (became bigger or not ejected).

(Scratch Resistance)

Three lines having a width of 3 mm and one line having a width of 17 mm (both of which have a recording duty of 100%) are recorded in parallel on a recording medium (trade name "DL 9084" manufactured by Mitsubishi Paper Mills Limited, basis weight of 91 $g/m^2$) to obtain an image sample 1. Within 3 minutes after recording, another recording medium (trade name "OK top coat+" manufactured by Oji Paper Co., Ltd., basis weight of 105 $g/m^2$) was superimposed on the image sample 1 and 500 g of a weight was placed so that a contact area was 12.6 $cm^2$. Then, a scratch resistance test in which the recording medium on which the image sample 1 was recorded and the other recording medium were rubbed once so that a relative speed therebetween was 10 cm/s was conducted. At this time, the recorded four lines were rubbed with the weight such that the contacting surface of the weight crossed perpendicularly thereto. Thereafter, the ink adhering to the region within 12.6 $cm^2$ on which the other recording medium was placed was read by a scanner to calculate a ratio (ink adhering area ratio) of an area occupied by a portion where luminance was lower than 128 of 256 gradations of brightness. As the scanner, a trade name of "Multi-function printer iR 3245F" (manufactured by Canon Inc., 600 dpi, gray scale, photograph mode) was used. Then, the scratch resistance of the image was evaluated in accordance with the following evaluation criteria. In the following evaluation criteria, "AA", "A" and "B" were regarded as preferable levels and "C" was regarded as an unacceptable level. The results thereof were shown in Tables 5 and 6.

AA: The ink adhering area ratio was 1% or less.
A: The ink adhering area ratio was more than 1% to 3% or less.
B: The ink adhering area ratio was more than 3% to 5% or less.
C: The ink adhering area ratio was more than 5%.

TABLE 5

Recording conditions and Evaluation results

| | | Recording condition Surface temperature | Evaluation result | |
|---|---|---|---|---|
| | Kind of ink | of recording medium to which ink has been applied (° C.) | Intermittent ejection property | Scratch resistance of image |
| Example 1 | 1 | 25 | A | B |
| Example 2 | 2 | 25 | A | A |
| Example 3 | 2 | 70 | A | AA |
| Example 4 | 3 | 25 | B | A |

TABLE 5-continued

Recording conditions and Evaluation results

| | Kind of ink | Recording condition Surface temperature of recording medium to which ink has been applied (° C.) | Evaluation result Intermittent ejection property | Scratch resistance of image |
|---|---|---|---|---|
| Example 5 | 4 | 25 | A | A |
| Example 6 | 5 | 25 | A | B |
| Example 7 | 6 | 25 | A | A |
| Example 8 | 7 | 25 | A | A |
| Example 9 | 8 | 25 | A | A |
| Example 10 | 9 | 25 | A | A |
| Example 11 | 10 | 25 | A | A |
| Example 12 | 11 | 25 | A | A |
| Example 13 | 12 | 25 | A | A |
| Example 14 | 13 | 25 | A | B |
| Example 15 | 14 | 25 | A | A |
| Example 16 | 15 | 25 | A | A |
| Example 17 | 16 | 25 | A | A |
| Example 18 | 17 | 25 | A | A |
| Example 19 | 18 | 25 | A | A |
| Example 20 | 19 | 25 | A | A |
| Example 21 | 20 | 25 | A | A |
| Example 22 | 21 | 25 | A | A |
| Example 23 | 22 | 25 | A | A |
| Example 24 | 23 | 25 | A | A |
| Example 25 | 24 | 25 | A | A |
| Example 26 | 25 | 25 | A | A |
| Example 27 | 26 | 25 | A | A |
| Example 28 | 27 | 25 | A | A |
| Example 29 | 28 | 25 | A | A |
| Example 30 | 29 | 25 | A | A |
| Example 31 | 30 | 25 | A | A |
| Example 32 | 31 | 25 | A | A |

TABLE 6

Recording conditions and Evaluation results

| | Kind of ink | Recording condition Surface temperature of recording medium to which ink has been applied (° C.) | Evaluation result Intermittent ejection property | Scratch resistance of image |
|---|---|---|---|---|
| Comparative Example 1 | 32 | 25 | C | A |
| Comparative Example 2 | 33 | 25 | C | A |
| Comparative Example 3 | 34 | 25 | C | A |
| Comparative Example 4 | 35 | 25 | C | A |
| Comparative Example 5 | 36 | 25 | C | A |
| Comparative Example 6 | 37 | 25 | C | A |
| Comparative Example 7 | 37 | 70 | C | AA |
| Comparative Example 8 | 38 | 25 | C | A |
| Comparative Example 9 | 39 | 25 | C | A |
| Comparative Example 10 | 40 | 25 | C | A |
| Comparative Example 11 | 41 | 25 | C | A |
| Comparative Example 12 | 42 | 25 | C | A |
| Comparative Example 13 | 43 | 25 | C | A |
| Comparative Example 14 | 44 | 25 | A | C |
| Comparative Example 15 | 45 | 25 | C | A |
| Comparative Example 16 | 46 | 25 | A | C |
| Comparative Example 17 | 47 | 25 | A | C |
| Comparative Example 18 | 48 | 25 | A | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-143573, filed Jul. 25, 2017, which is hereby incorporated by reference herein in its entirety.

What is claimed is:

1. An aqueous ink for ink jet, comprising:
   a solvent A; and
   a resin particle,
   wherein the solvent A is alcohol of which aqueous solubility at 20° C. is 5% by mass or less, a vapor pressure at 20° C. is 0.5 mmHg or less, and a surface tension at 20° C. is 30 mN/m or more,
   wherein a content (% by mass) of the solvent A is 0.7 times or more to 7.0 times or less based on the aqueous solubility (% by mass) of the solvent A at 20° C., and
   wherein the amount of a surface anionic functional group of the resin particle is 0.55 mmol/g or more to 2.00 mmol/g or less.

2. The aqueous ink according to claim 1, further comprising a coloring material.

3. The aqueous ink according to claim 2, wherein the coloring material is a self-dispersible pigment.

4. The aqueous ink according to claim 2, wherein the coloring material is a pigment.

5. The aqueous ink according to claim 1, wherein the solvent A is monovalent alcohol having a benzene ring.

6. The aqueous ink according to claim 1, wherein the aqueous solubility of the solvent A at 20° C. is 3% by mass or less.

7. The aqueous ink according to claim 1, wherein the solvent A is one selected from the group consisting of benzyl alcohol, 2-phenoxyethanol, phenethyl alcohol, 1-phenoxy-2-propanol and 1-phenyl-2-propanol.

8. The aqueous ink according to claim 1, further comprising a solvent B which is one selected from the group consisting of glycerin, triethylene glycol, ethylene glycol, diethylene glycol, propylene glycol, methyl carbitol, 2-pyrrolidone and carbitol.

9. The aqueous ink according to claim 1, wherein a content (% by mass) of the resin particle is 1.0% by mass or more to 7.0% by mass or less, based on a total mass of the ink.

10. The aqueous ink according to claim 1, wherein the content (% by mass) of the solvent A is 1.0 times or more to 5.0 times or less based on the aqueous solubility (% by mass) of the solvent A at 20° C.

11. An ink cartridge comprising:
an ink; and
an ink storage portion that stores the ink,
wherein the ink is the aqueous ink according to claim 1.

12. An image recording method comprising an ink applying step of ejecting the aqueous ink according to claim 1 from a recording head for ink jet to apply the aqueous ink on a recording medium conveyed under the recording head.

13. The image recording method according to claim 12, further comprising a heating step of heating the recording medium to which the aqueous ink is applied so as to have a surface temperature of 70° C. or higher.

14. The image recording method according to claim 12, further comprising a conveying step of conveying the recording medium at a speed of 50 m/min or more.

15. The aqueous ink according to claim 1, wherein the aqueous solubility of the solvent A at 20° C. is 0.1% by mass or more to 3.0% by mass or less.

16. The aqueous ink according to claim 1,
wherein the solvent A is monovalent alcohol having a benzene ring, and
wherein the aqueous solubility of the solvent A at 20° C. is 0.1% by mass or more to 3.0% by mass or less.

* * * * *